Jan. 20, 1953 R. A. ROAD ET AL 2,626,309
HEAVY-DUTY METER FACILITIES
Filed Oct. 1, 1949 4 Sheets-Sheet 1

Inventors
Orville K. Coleman &
Richard A. Road
By:- Louis Robertson Atty.

Jan. 20, 1953    R. A. ROAD ET AL    2,626,309
HEAVY-DUTY METER FACILITIES

Filed Oct. 1, 1949    4 Sheets-Sheet 3

Inventors
Orville K. Coleman &
Richard A. Road
By: Louis Robertson  Attys.

Jan. 20, 1953     R. A. ROAD ET AL     2,626,309
HEAVY-DUTY METER FACILITIES
Filed Oct. 1, 1949     4 Sheets-Sheet 4
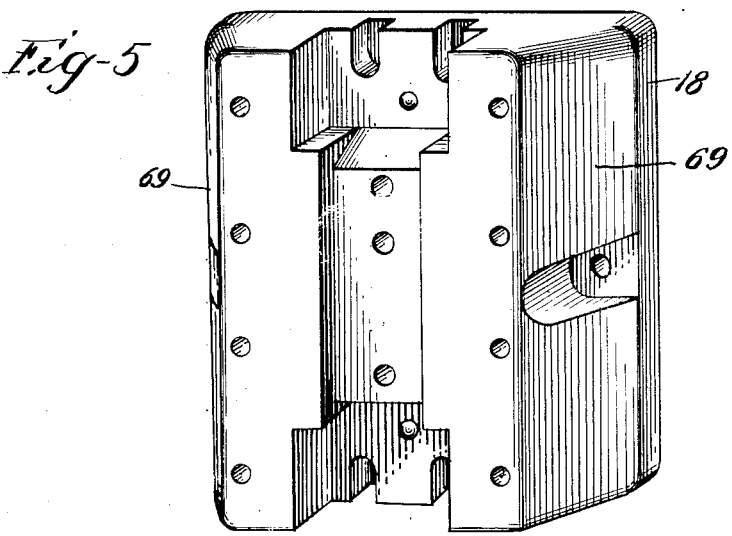
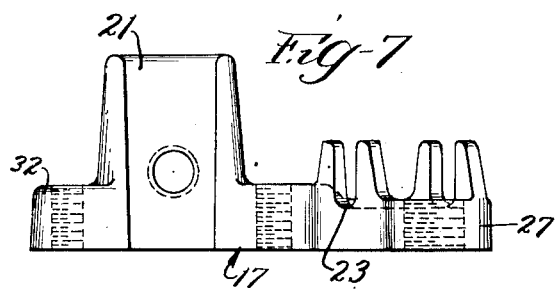
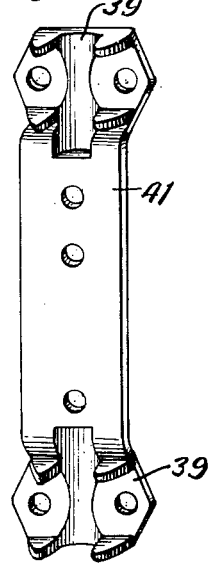
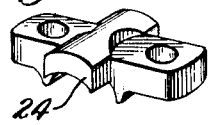
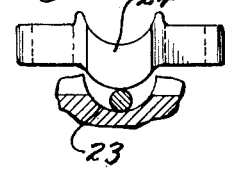
Inventors
Orville K. Coleman &
Richard A. Road
By:- Louis Robertson Atty.

Patented Jan. 20, 1953

2,626,309

UNITED STATES PATENT OFFICE 2,626,309

HEAVY-DUTY METER FACILITIES

Richard A. Road and Orville K. Coleman, West Lafayette, Ind., assignors to Duncan Electric Manufacturing Company, La Fayette, Ind., a corporation of Illinois Application October 1, 1949, Serial No. 119,074

5 Claims. (Cl. 175—223)

In using watthour meters and other similarly connected electric meters for measuring heavy loads, in the neighborhood of 200 amperes, for example, it has been the practice heretofore to avoid running the main current measured through the meter. Instead of this, a current transformer has been used so that only a small current proportional to the main current would pass through the meter. Such transformers have involved added expense, added cost in installation, and some further chance for inaccuracy of measurement or failure. It has been thought necessary to avoid carrying such heavy loads through the meter because excessive temperatures would have resulted from the passage of such a heavy current. The resistance such as points of contact resistance and resistances in the leads running to the current coil, as well as the resistance of the current coil itself, have seemed unavoidable from a practical standpoint without making the meter excessively large which would in turn require special designs not produced in large quantity, and this in its turn would mean high cost.

A further fact which was given consideration in this invention is that the majority of the watthour meters now being manufactured in the United States are of the "socket" type (such as described in U. S. Patents 1,606,345; 1,783,547; 1,789,710; 1,893,177; 1,969,499; et al.) in which the meter itself is provided with "knife blade" terminals protruding from the back of the casing in such manner that the meter can be "plugged into" a meter socket having spring clip "jaws" adapted to receive the blades of the meter. In recent years the increasing use of electricity has multiplied the number of installations required to handle loads in the range of 100 to 200 amperes to the extent that a definite need developed for methods of measuring loads in this range that would to a large extent have the simplicity and economy of the standard meter and socket, preferably using standard parts to a large extent.

Because of the wide-spread use of the socket type meter, it was felt that it would be highly desirable for the new meter mounting device to be capable of receiving the older types of meters, and for the new increased-capacity meter to be capable of successful operation in the old-style sockets. This interchanging is desirable to permit emergency use of all meters in all sockets, and to take care of situations needing less than the full advantages of this invention.

According to the present invention the direct measurement with electric meters of loads in the 200 ampere range, much higher than heretofore practical, is made practical. This is accomplished in large part by providing connectors which minimize contact resistance so that very little heat is developed except by conductor resistance and keeping even that at a minimum by devising conductor arrangements which permit relatively heavy cross sections. Various problems attendant upon a practical accomplishment of this broad concept have been overcome. The current circuit within the inner or main meter case has been made to cooperate with the external connections to draw heat out from the main meter case.

Additional objects and advantages of the invention will be apparent from the following description and from the drawings, in which:

Fig. 2a is a perspective view of one form of current coil circuit, a part of the current coil ring being shown only in dotted lines and some dimensions being exaggerated for clarity.

Fig. 5 is a perspective view of the terminal block prior to application of the conductor parts thereto.

Fig. 6 is a perspective view of the central conductor strap.

Fig. 7 is a side view of one of the connector castings.

Fig. 8 is a perspective view of a connector clamp piece used in connection with the casting in Fig. 7.

Fig. 9 is a fragmentary view illustrating the coaction of the clamp piece of Fig. 8 and the casting of Fig. 7 when the clamp piece is inverted for use with a small wire. For example, a heavy duty meter box may be installed for future heavy loads while only ordinary loads and ordinary service wires are being used.

Figure 1:
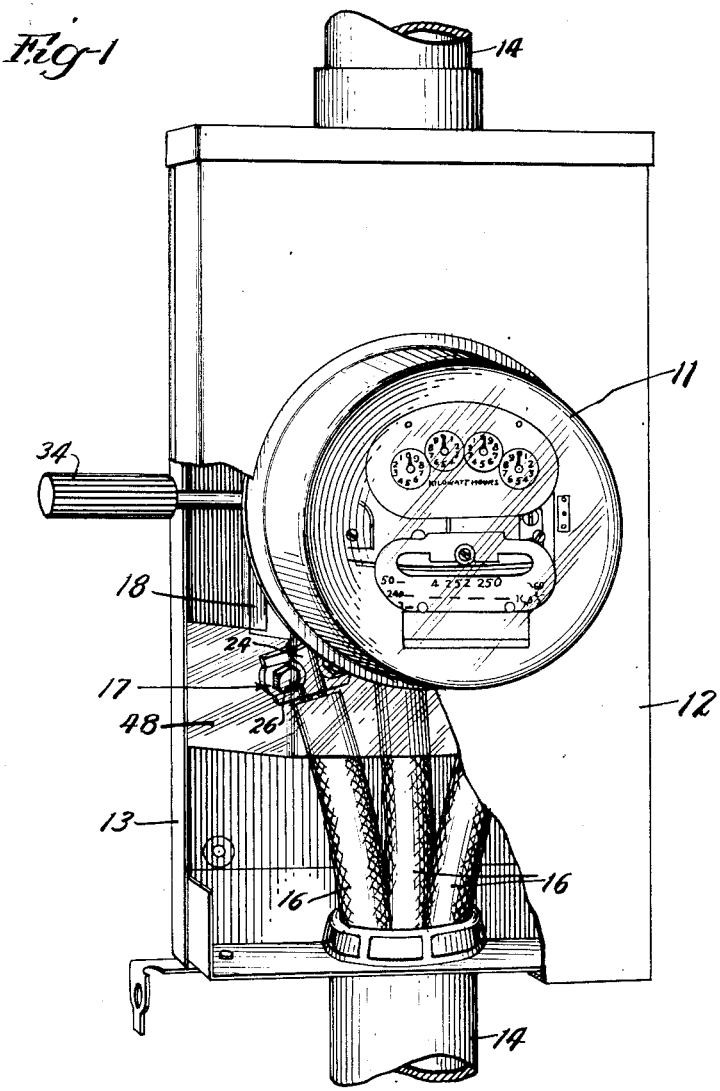
Figure 1 is a perspective view of the embodiment of the invention chosen for illustration, the cover being partly broken away. For illustration a by-pass connector tool is shown in place although it could only be used if the cover were removed.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

The illustrated form of the invention includes a watthour meter 11 protruding through a cover 12 of meter box 13, the latter usually being mounted on a wall. The meter-receiving aperture is sealed by a gasket 12'. The meter box 13 has conduit 14 extending into it at top and bottom, each conduit having heavy cables or service conductors 16 extending therethrough for connection to one another through the meter. Each of the conductors 16 is connected to a connector unit 17 or 38 carried by an insulating terminal block 18.

The illustrated form of meter 11 is of the socket type having terminal blades 15 extending rearwardly therefrom. Each of the connector units 17 includes a screw clamp portion 21, 22 for clamping one of these terminal blades on the meter.

Figure 3:
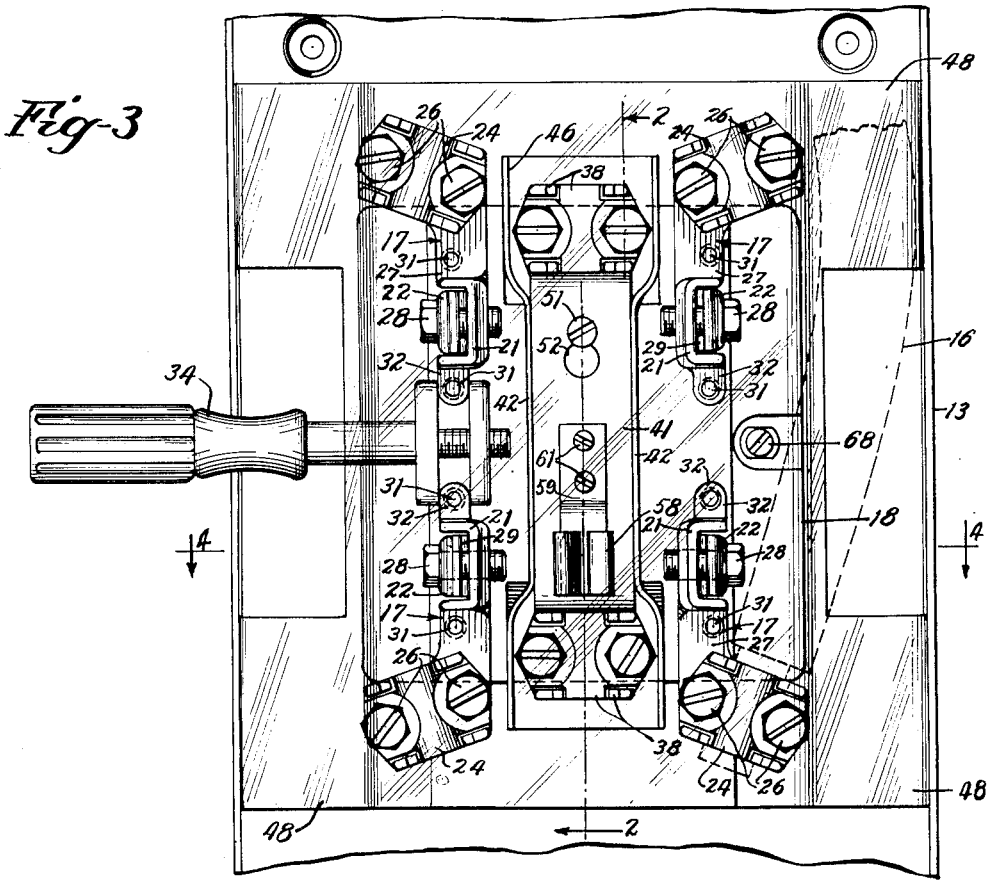
Fig. 3 is a fragmentary view showing the face of the connector block assembly with a by-pass connection in place.

The connector units 17 represent an important part of the present invention. They make a firm pressure contact of low resistance with the service conductor and with the terminal blade and are of sufficiently heavy cross-section between them so that very little heat is developed within the connector units. Furthermore, the angular shape of the connector units 17 facilitates the connection thereto of a very stiff, heavy service conductor 16. The angularity shown in Fig. 1 and shown more clearly in Fig. 3 has been found fairly suitable. However, in order to permit flexing a heavy conductor around the block from the far end of the block an angularity of about five degrees less than that shown (five degrees further removed from the perpendicular) is preferred.

The end of each connector unit 17 engaging the service conductors is preferably approximately in the form of a commonly used connector clamp of the saddle type. Thus the conductor is laid in a channel 23 (Fig. 7) and a saddle type clamp bar 24 is applied over it. Screws 26 are then inserted and screwed into the main bar 27 of connector unit 17 to clamp the clamp bar 24 firmly onto the conductor. When the heavy conductors illustrated in Fig. 1 are used, the clamp bar 24 would be applied with its concave side against the conductor as a saddle. Of course the saddle could be pressed against the conductor in some other manner. Preferably the other side of clamp bar 24 is convex as seen in Fig. 8 so that when a small conductor is used, as seen in Fig. 9, the clamp bar 24 can be applied with its convex side against the conductor, inasmuch as the concave side would fail to grip the conductor.

The main bar 27 of the connector unit 17 is of heavy cross-section throughout its length from the groove 23 to the clamp portion 21, and preferably even to the upper end of the clamp portion 21. The terminal blade of the meter is pressed firmly against clamp portion 21 by a movable clamp jaw 22 which is urged against the terminal blade by a screw 28 threaded into the clamp portion 21. The portion 21, jaw 22 and screw 28 thus form a small vise. The movable jaw 22 is preferably provided with a lug 29 at its rear end to ensure adequate pressure at the front portions of the jaws where they engage the terminal blade. As a matter of fact, it is preferred that the pressure of the jaws on the blade be firm even close to the tip of the jaws. It is possible to make the jaws of heavier cross-section than the blade and hence it is desirable to reduce the length of blade through which current must flow in passing from the jaws to the inside of the meter. Not only does this reduce the generation of heat, but it also increases the removal of heat from the inside of the meter by heat conduction through the terminal blade and through the clamp jaws 21 and 22.

The connector unit 17 is secured to the insulating terminal block 18 by a pair of screws 31 passing through the terminal block and threaded into the connector unit 17. One of these screws threads into an outstanding lug 32 forming an integral part of the main bar 27. As will be observed from Fig. 3, the lugs 32 on the lower connector units 17 are aligned with similar lugs 32 on the upper connector units 17. These lugs are appropriately spaced so that the meter may be by-passed by applying a by-pass tool 34, as seen best in Fig. 3. Of course one such tool should be applied on each side of the terminal block so that each of the bottom conductors connected to connector units 17 is connected through the associated by-pass tool with the corresponding top conductor connected to the corresponding connector unit 17. If, as is often the case in heavy duty circuits, there is a third conductor, the lower and upper third conductors are respectively connected to the lower and upper connector clamps 38. As seen best in Fig. 6, the base portions 39 of these clamps are integral with a central conductor strap 41, so that these third conductors are connected together independently of the meter and do not need a by-pass tool.

Figure 4:
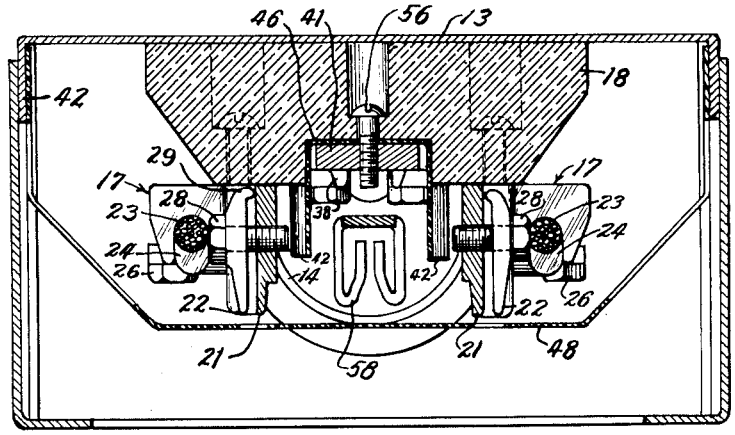
Fig. 4 is a transverse horizontal sectional view taken approximately on the line 4—4 of Fig. 3, but with the cover applied, the meter nevertheless being omitted for clarity.

As seen in Figs. 1 and 4, the side wall 42 of meter box 13 is of such low height that it does not interfere with access of the by-pass tool 34 to the lugs 32. Accordingly, these tools may be in place whenever the cover 12 is removed. Should it be necessary to replace a meter while an installation is in service, the cover 12 is removed, the by-pass tools 34 are inserted from either side, slipped onto the lugs 32, and tightened thereon by a clamping action produced by turning the handle of tool 34, thus completing the by-pass. The clamp screws 28 may now be loosened, the meter slipped off and a new meter installed. Thereafter the screws 28 are tightened and the by-pass tools 34 removed.

It is desirable to insulate the parts more fully than they would be insulated merely by mounting them on the insulating block. Accordingly, a somewhat channel-shaped insulator 46 is inserted under the central conductor strap 41. This insulator preferably extends the full length of the central conductor strap 41 and beyond the clamp portions at the ends thereof. It thus prevents accidental bridging between the various conductive members either when working on the clamps on the various connector units or when applying the by-pass tool 34.

Figure 2:
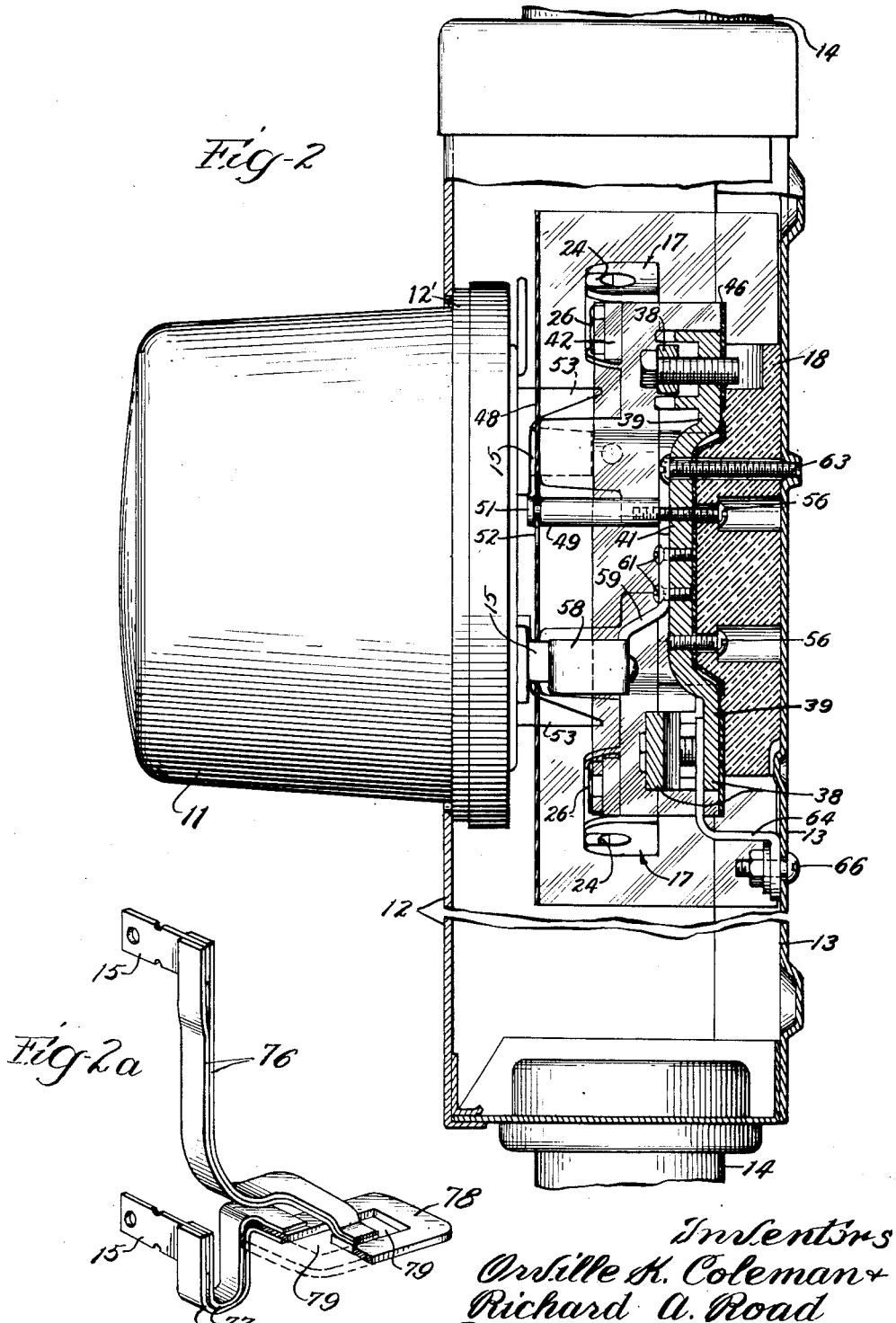
Fig. 2 is a view of the structure shown in Fig. 1 seen mainly in a central vertical section, the section being slightly irregular and taken along the line 2—2 of Fig. 3.

As seen best in Figs. 1, 2 and 4, a removable insulating shield 48 is preferably positioned over the entire terminal block assembly and exposed conductor ends. This substantially eliminates the danger of accidental contact with the electrical parts in applying the meter after the wiring has been completed. Some meter handlers hold a meter with their fingers extending around behind the base plate, being accustomed to a round socket or wall base which serves somewhat as a guide or protection.

The insulating shield 48 can conveniently be supported by one or more posts 49 of insulating material having buttons 51 at the end thereof which fit through keyhole slots 52 in the insulating shield 48. Other slots or holes are punched out of the insulating shield 48 to receive the terminal blades and associated insulating brackets 53, although these have been omitted from Fig. 3 for the sake of clarity. Both the insulating shield 48 and the insulator 46 may be made of a synthetic sheeting material, a transparent material such as cellulose acetate having been found convenient for reasons of visibility.

The sides of the shield 48 may be tucked within the side walls 42 of the box 13. This will hold the shield properly positioned when only one post 49 is used. The post 49 may conveniently be secured by screwing it onto the protruding end of screw 56 which holds central conductor strap 41 on terminal block 18. As seen in Fig. 2, there are two such screws. Under some circumstances a post 49 will be provided on each of these screws 56. In other instances the lower post 49 would be omitted to make room for a fifth jaw device 58 which is required with some circuits as a voltage connection. This connection does not carry a heavy load of current and therefore a spring jaw type of clamp such as has commonly been used in meter sockets heretofore will suffice. This clamp 58 may be carried by a bracket 59 secured to central conductor 51 by two screws 61. It will thus be apparent that bracket 59 completes the voltage connection as well as supporting the jaw 58.

It is desirable that the central conductor 41 be well-grounded. This can be accomplished by passing a screw 63 through it and through the terminal block 18 and threading it into the back of box 13. It is at present preferred, however, that a grounding like 64 (shown only in Fig. 2) be laid in the lower central clamp 38 to be clamped under the service conductor therein. This grounding link 64 may extend downwardly and laterally to a convenient position to a binding post construction 66 which may serve simultaneously for connecting it to the box 13 and connecting a separate ground conductor to a suitable ground such as a water pipe. Whether or not the grounding screw 63 is used, the terminal block 18 may be secured to the box 13 by a plurality of screws 68.

The terminal block 18 may be of a fairly simple, mainly rectangular shape, except for being recessed, as seen in Fig. 5, to receive the central terminal conductor 41. However, a beveling of the sides at 69 is preferred. This facilitates extending a heavy conductor around the terminal block and to the connecting clamp at the far end thereof when necessary, as shown dotted in Fig. 3. If desired, the terminal block 18 may also be provided with small recesses (not shown) to receive connecting links which would ordinarily be used with spring jaw clamps when heavy duty requirements are not expected. Thus the block 18 may be used with either the heavy duty connecting facilities of the present invention or with the ordinary spring jaw clamp type of connecting facilities. In fact, a terminal block similar to that illustrated may be made to fit the conventional round metal socket bases.

Although the preferred form of the invention for two or three-wire circuits has been shown, it will be apparent that many changes may be made without departing from the spirit of the invention. Furthermore, the invention may be similarly embodied in a connecting block assembly for use with the seven-blade meters which are required for certain types of circuits.

For the heavier loads which the illustrated form of connecting block assembly is adapted to handle, there may be some special meter requirements in order to avoid an excessive temperature rise within the meter. Indeed, a feature of the preferred form of the invention is to conduct heat out from the current coil and its leads within the meter fast enough to prevent excessive temperature rises. The construction already described is adequate for conducting heat away from the terminal blades 15, but high conductivity means to deliver heat from the current coil circuit within the meter 12 to the terminal blades 15 is required. For example, the connections between the meter terminal blades and the current coil of the meter could be in the form of a heavy bus bar.

Greater flexibility than that is desirable, however, and in the construction now preferred a multi-strip bus bar connection is used because it has considerably greater flexibility. Thus as seen in Fig. 2a the bus bar connections are formed of two flat copper straps 76 or 77, each thin enough to be bent by hand easily. The two together, being separate except at their ends, are also reasonably flexible. Their combined cross-section throughout most of their length (in fact everywhere except near the current coil 78 where space does not permit) is nevertheless greater than the cross-section of blade 15. Straps 76 and 77 are preferably silver-soldered at each end to the associated conductors 15 or 78. The silver solder joint is of low resistance, both electrically and thermally. When space permits, the two straps of one pair are soldered directly to opposite faces of the adjacent conductor, for lowest resistance, as clearly seen at the two terminal blades 15. The straps 76 and 77 could be integral with the current coil, in which case the current coil would also be formed of two layers. The illustrated form is essentially a solid ring. The upper straps 76 pass between the spaces 79 left for the iron cores, and connect with the opposite faces of the front side of the ring or current coil 78, or an integral lug projecting therefrom. The lower straps 77 are soldered to the rear side of the ring 78. It will be recognized that the other two terminal blades 15 would be in a separate but similar current coil circuit.

According to one modification, side-by-side leads of approximately square cross-section may be used. This has an advantage that the same square wires may be continued to form the right and left halves, respectively, of the current coil. The illustrated form is preferred because of greater flexibility than with square wire of equally low resistance.

It is important that the connecting strap be of sufficient cross-section and that its connections be good enough to avoid excessive generation of heat and to conduct heat out of the meter through the terminal blades.

It is important that the total resistance of the connector units 17 be substantially lower than that of the spring jaw and connecting straps heretofore used. With given dimensions, the choice of alloy for the casting is important. Alloys having at least 40% of the conductivity of pure copper are preferred and are readily available for commercial casting. Samples as low as 17% of the conductivity of copper have been tested and found reasonably satisfactory with substantially the shapes shown. The resistances thus known to be satisfactory are as follows:

With 40% conductivity alloy: 16 microhms (approximate)
With 17% conductivity alloy: 16 microhms (calculated)

The resistance was measured by drilling a fine hole from the back toward and close to the middle of the main contact areas so as to solder the test leads virtually to the metal forming the center of main contact (near the tip of jaw 21 and in the center of channel 23) with the usual blade and cable. The test leads were used in the usual way to measure the voltage drop with a given amperage flowing through the usual connections.

A unit cast of an alloy having only 6% of the conductivity of copper, and having a calculated resistance of 107 microhms was found to have excessive temperature rise. Thus an effective resistance as low as 16 to 20 microhms is preferred but a resistance up to 40 to 60 microhms appears acceptable. The electrical length between the main contact centers is estimated to be about 2¾ inches, indicating that the resistance may be as high as 15 to 22 microhms per inch of length. It is well recognized that in clamp type copper to copper connections a temperature rise of 30° C., but not much more, is acceptable.

The connector units 17 should be of a size adapted to receive No. 0000 cable. To serve continuously with a 200 ampere load, a cable that large co-operates with the other features, namely the special connector units 17 and special internal connections, to draw enough heat from the current circuit to avoid overheating.

The cover 12 of the meter box 13 may be removable in any suitable manner and may be provided with any suitable means for applying the conventional twisted wire and lead seal.

Adapters may be provided for connecting a base-connected meter through the terminal block shown or such a meter may be connected through a similar block combined with leads appropriate for base-connected meters.

The by-pass features illustrated but not claimed herein are the subject of a separate application owned by the same assignee. The application referred to is Serial No. 317,130, filed October 27, 1952, by Orville K. Coleman, entitled Meter By-Pass Facilities.

We claim:

1. Electric meter connecting facilities for direct measurement of heavy electrical loads including a meter box, an insulative terminal block carried by and within the meter box, connector units carried by said block and each having a saddle type connector clamp for receiving heavy duty service conductors, the jaws of said clamp having concave jaw faces and being thick and sturdy to withstand heavy screw pressure on opposite sides of the wire, and screw-type vise-like clamps having a pair of jaw elements for receiving a blade of the meter, a screw spaced adjacent the blade-receiving portion for cooperating directly with both jaw elements for tightening the jaw elements against the blade, one jaw element of the vise-like clamp being positioned to engage said blade directly and being integrally connected through a conductor portion of heavy cross-section with one element of the saddle clamp, a meter case, a meter unit within said case including a main current-carrying circuit terminating with said blade, said circuit including twin conductor leads each silver-soldered directly to said blade and jointly having a cross-section through most of their length greater than that of the blade, said clamp-gripping said blade close to the case.

2. Electrical meter connecting facilities for direct measurement of heavy electrical loads including a meter box, an insulative terminal block carried by and within the meter box, connector units carried by said block and each having a saddle type connector clamp for receiving heavy duty service conductors, and screw type vise-like clamps for receiving a blade of the meter, one element of the vise-like clamp being integrally connected through a conductor portion of heavy cross-section with one element of the saddle clamp, a meter case, a meter unit within said case including a main current-carrying circuit terminating with said blade, said circuit including flat copper-strap leads each silver-soldered directly to said blade and jointly having a cross-section through most of their length greater than that of the blade, said clamp gripping said blade close to the case.

3. Electric meter connecting facilities for direct measurement of heavy electrical loads including a meter box, an insulative terminal block carried by and within the meter box, connector units carried by said block and each having a saddle type connector clamp for receiving heavy duty service conductors, and screw type vise-like clamps for receiving a blade of the meter, one element of the vise-like clamp being integrally connected through a conductor portion of heavy cross-section with one element of the saddle clamp, a meter case, a meter unit within said case including a main current-carrying circuit terminating with said blade, said circuit including flat copper-strap leads each silver-soldered directly to said blade and jointly having a cross-section through most of their length greater than that of the blade.

4. Electric meter connecting facilities for receiving and connecting, for direct measurement of heavy electrical loads, a watt-hour meter subject to heating by measurement of said loads and having at least four connecting terminal blades, said connecting facilities comprising a meter box, an insulative terminal block carried by and within the meter box, at least four connector units carried by said block and each having a connector clamp constructed for receiving and clamping with high pressure a heavy duty service conductor and a blade-receiving clamp opening in the direction of the front of the box and constructed for receiving and clamping with high pressure one of said blades; a single piece of conductive metal in each connector unit forming a clamping face member for each clamp thereof and a connecting portion extending substantially directly between the nearest portions of said face members, said face members and connecting portion having higher conductance per unit of length throughout their length than said blade, whereby the connector units will draw heat from the meter to prevent overheating.

5. Electric meter connecting facilities for receiving and connecting for direct measurement of heavy electrical loads, a watt-hour meter subject to heating by measurement of said loads and having at least four connecting terminal blades of $\tfrac{3}{32}$ inch by ¾ inch cross-section, said connecting facilities comprising a meter box, an insulative terminal block carried by and within the meter box, at least four connector units carried by said block and each having a saddle-type connector clamp constructed for receiving and clamping with high pressure a heavy duty service conductor and a blade-receiving clamp opening in the direction of the front of the box and constructed for receiving and clamping with high pressure one of said blades; a single piece of conductive metal in each connector unit forming a clamping face member for each clamp thereof and a connecting portion extending substantially between the nearest portions of said face members, said face members and connecting portion having higher conductance per unit of length throughout their length than a copper blade of $\frac{3}{32}$ inch by $\frac{3}{4}$ inch cross-section, whereby the connector units will draw heat from the meter to prevent overheating.

RICHARD A. ROAD.
ORVILLE K. COLEMAN.

REFERENCES CITED

The following references are of record in the file of this patent:

UNITED STATES PATENTS

| Number | Name | Date |
|---|---|---|
| Re. 21,148 | Mylius | July 11, 1939 |
| 1,092,430 | Cole | Apr. 7, 1914 |
| 1,504,993 | Strughold | Aug. 12, 1924 |
| 1,981,343 | Borden | Nov. 20, 1934 |
| 2,066,300 | Mylius | Dec. 29, 1936 |
| 2,086,495 | Garner | July 6, 1937 |
| 2,178,092 | Werner | Oct. 31, 1939 |
| 2,218,650 | Larson | Oct. 22, 1940 |
| 2,255,122 | Markley | Sept. 9, 1941 |
| 2,370,043 | Johansson | Feb. 20, 1945 |
| 2,425,802 | Harris et al. | Aug. 19, 1947 |
| 2,431,999 | Engelhardt | Dec. 2, 1947 |
| 2,452,494 | Rothen | Oct. 26, 1948 |

FOREIGN PATENTS

| Number | Country | Date |
|---|---|---|
| 701,151 | Germany | Jan. 9, 1941 |